No. 897,935.
PATENTED SEPT. 8, 1908.
O. SCHWARZ.
COTTON TOPPER.
APPLICATION FILED DEC. 14, 1907.

4 SHEETS—SHEET 1.

Witnesses
Chas. T. Jennings
L. O. Little

Inventor
Oscar Schwarz
By Walson E. Coleman
Attorney

No. 897,935.

PATENTED SEPT. 8, 1908.

O. SCHWARZ.
COTTON TOPPER.
APPLICATION FILED DEC. 14, 1907.

4 SHEETS—SHEET 4.

Witnesses
Chas. T. Jennings.
L. O. Little.

Inventor
Oscar Schwarz
By Watson E. Coleman
Attorney

UNITED STATES PATENT OFFICE.

OSCAR SCHWARZ, OF GRANGER, TEXAS.

COTTON-TOPPER.

No. 897,935.   Specification of Letters Patent.   Patented Sept. 8, 1908.

Application filed December 14, 1907. Serial No. 406,496.

*To all whom it may concern:*

Be it known that I, OSCAR SCHWARZ, a citizen of the United States, residing at Granger, in the county of Williamson and State of Texas, have invented certain new and useful Improvements in Cotton-Toppers, of which the following is a specification, reference being had to the accompanying drawings.

My invention relates to improvements in machines for topping cotton plants or the like.

One object of the invention is to provide a topping mechanism which will be simple and inexpensive in construction and very effective in accomplishing its intended purpose.

Another object of the invention is to provide a cotton topping mechanism in the form of an attachment which may be readily used upon a wheeled, straddle-row cultivator.

Another object of the invention is to provide a cotton topping attachment for a cultivator which may be readily adjusted thereon to cut or top the cotton plants to a greater or less extent as may be found necessary.

Figure 1:
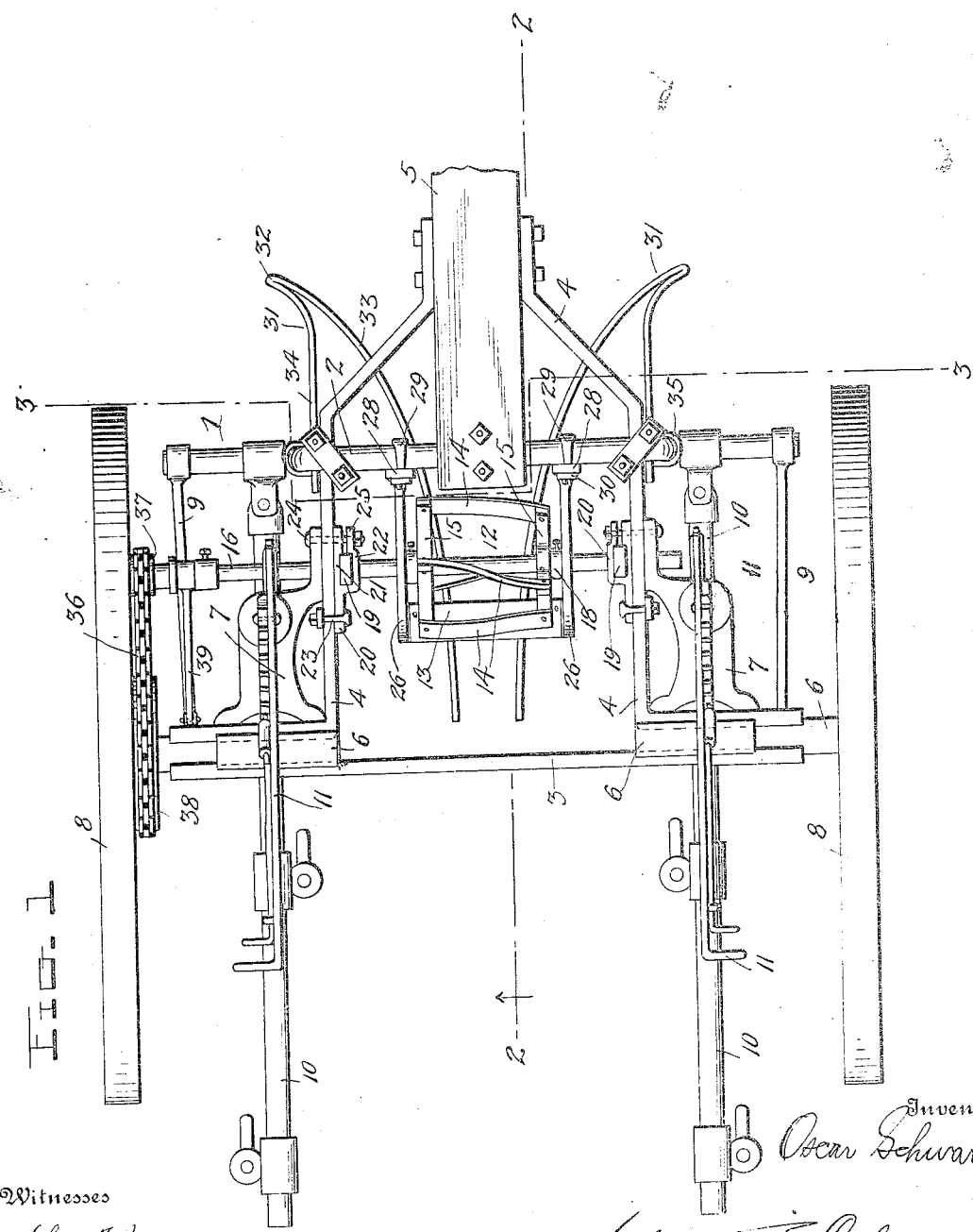
Figure 2:
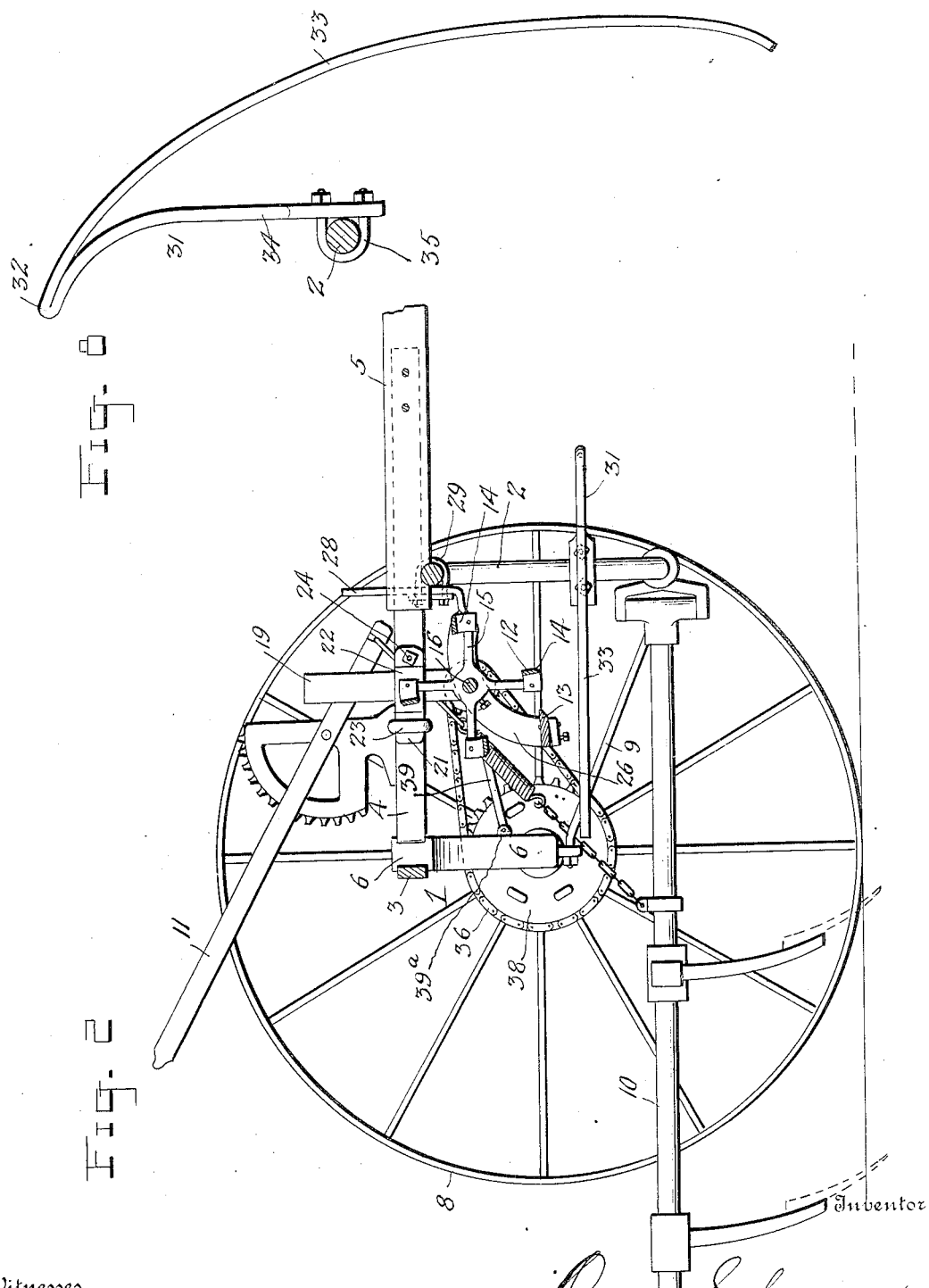
Figure 3:
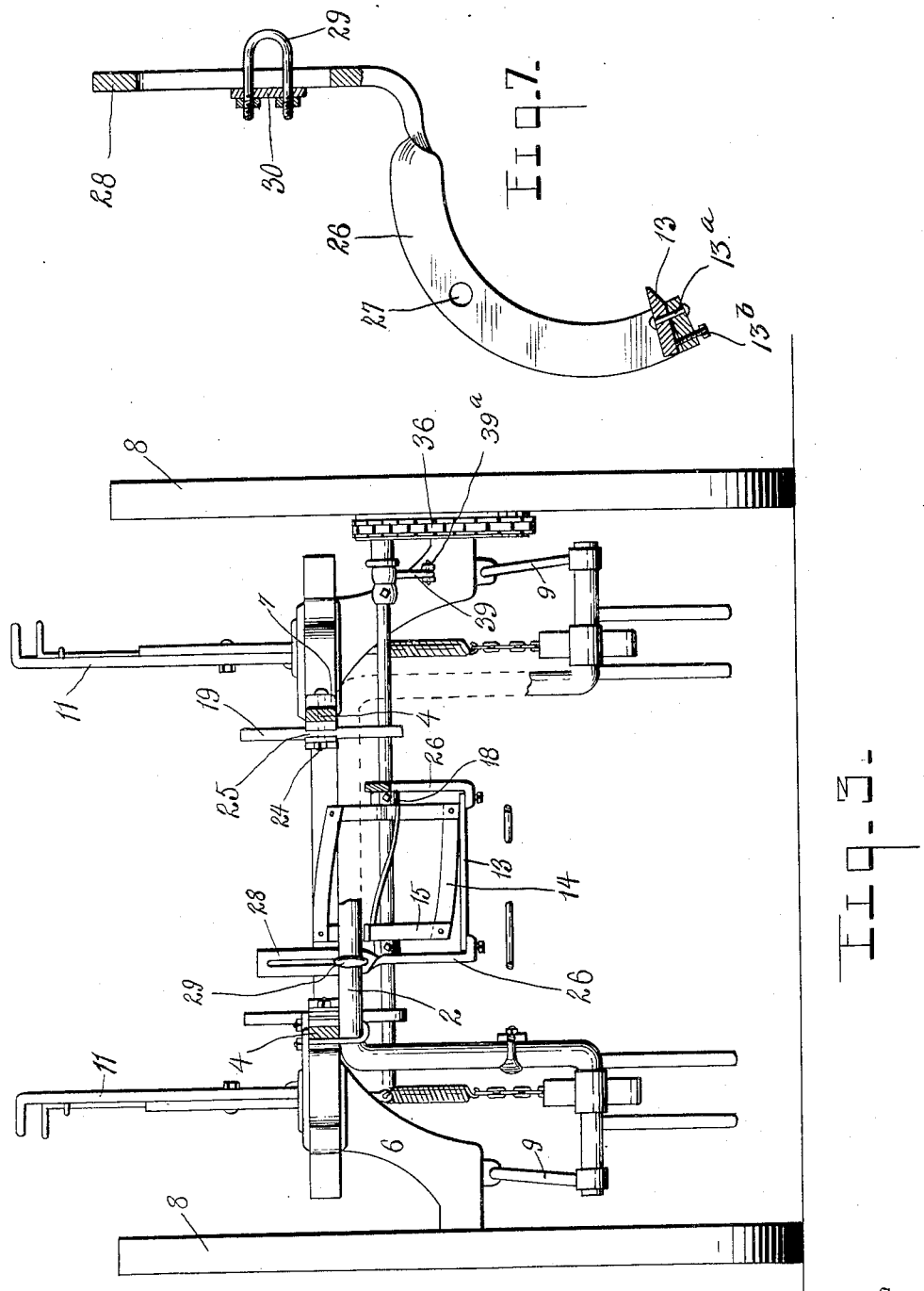
Figure 4:
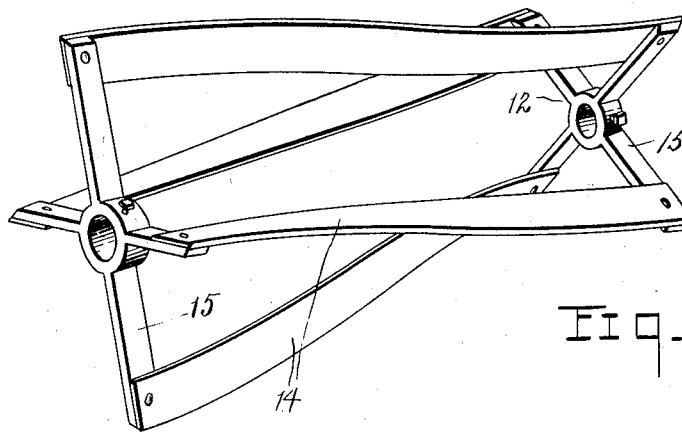
Figure 5:
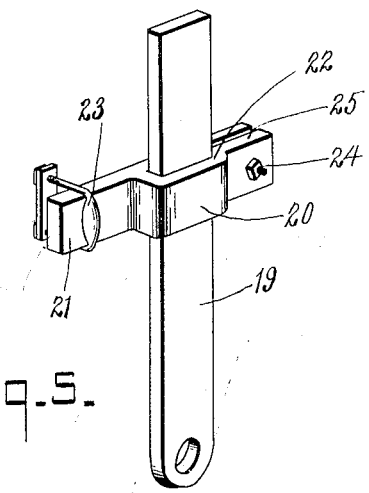
Figure 6:
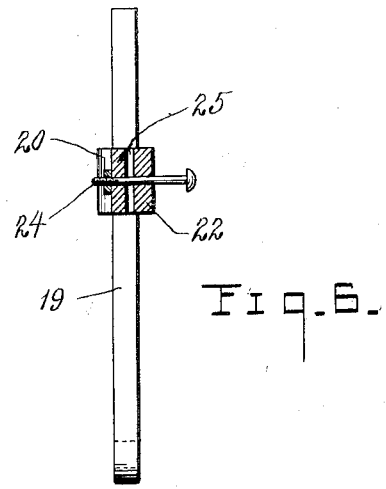

With the above and other objects in view, the invention consists of the novel features of construction and the combination and arrangement of devices hereinafter described and claimed, and illustrated in the accompanying drawings, in which Figure 1 is a top plan view of a cultivator showing my cotton topping attachment applied thereto; Fig. 2 is a vertical longitudinal section taken on the plane indicated by the line 2—2 in Fig. 1; Fig. 3 is a vertical transverse section taken on the plane indicated by the line 3—3 in Fig. 1; Fig. 4 is a perspective view of the cutting mechanism removed from the cultivator; Figs. 5 and 6 are detail views of one of the adjustable bearings for the cutter shaft; Fig. 7 is a detail view of one of the hangers for the stationary knife; and Fig. 8 is a detail view of one of the deflecting or guiding arms.

In the drawings 1 denotes a well known form of wheeled, straddle-row cultivator which comprises a frame consisting of front and rear arched members 2, 3 united by longitudinally extending side bars 4, the forward ends of which latter are brought together to receive the tongue 5 between them. The tongue has its rear end also secured to the center or arched portion of the front arched member or cross bar 2. The rear arched member 3 comprises a straight cross bar secured to the upper ends of two spindle carrying brackets 6 to which latter are also secured the angular rear ends of the side bars 4 and horizontally disposed bracing members or castings 7 as clearly shown in Fig. 1. Supporting wheels 8 are journaled upon the spindles on the brackets 6, which latter together with their connecting cross bar form an arched axle. The lower portions of the brackets 6 are connected to the lower ends of the front arched member or cross bar 2 by bracing rods 9 and connected to said lower portions of the bar or member 2 by means of universal couplings are rearwardly extending cultivator beams 10. These beams are adapted to be raised and lowered and adjusted by mechanisms mounted upon the bracing brackets or castings 7 and controlled by hand levers 11 as will be readily understood upon reference to the drawings.

My improved topping mechanism for cotton plants or the like may be mounted upon a wheeled supporting structure of any suitable form and construction, but the preferred embodiment of my invention illustrated in the drawings is in the form of an attachment especially designed for use upon a cultivator of the type above described.

The invention comprises a rotary cutter 12 and a co-acting stationary knife 13 both of which are mounted in the upper or arched portion of the cultivator frame. The cutter 12 consists of an annular series of twisted, longitudinally-extending cutter blades 14 secured at their ends to the arms of spiders 15 arranged upon a transverse shaft 16. The spiders 15 and their connecting blades form a rotary cutting drum or wheel which is secured upon the shaft by means of set screws 17 arranged in hubs or collars 18 at the ends of the spiders 15. The transverse shaft 16 is journaled in bearing openings in the lower ends of vertically adjustable hanger bars 19 mounted for sliding movement in clamps 20. These clamps are in the form of castings having base portions 21 to engage the side bars 4 and slotted enlargements 22 to receive the hanger bars 19. The base portions 21 are secured at one end upon the bars 4 by clips 23 and at their opposite ends by bolts 24 which also pass through portions of the brackets 7 and through split portions 25 of the enlargements 22 so that when the bolts 24 are tightened the hanger bars 19 will be securely clamped. By mounting the shaft in this manner it will be seen that the rotary cutter may be adjusted vertically to operate upon cotton of any height and to top it to a greater or less extent.

The stationary knife 13 which co-acts with the rotary cutter, is arranged slightly below and in rear of the same and preferably comprises a plate adjustably secured at its ends to the bent ends of two hanger bars or brackets 26 which are formed with apertures 27 to loosely receive the shaft 16. These hangers 26 are arranged at the ends of the rotary cutter and their upper ends are adjustably mounted so that the stationary knife may be adjusted with the rotary cutter. These upper ends of the hanger bars 26 are formed with longitudinal slots 28 and are clamped upon the central or top portion of the front cross bar or member 2 by U-shaped bolts or clips 29 which pass around the bar 2 through the slots 28 and also through washer plates 30 as clearly shown in Fig. 7. It will be seen that by adjustably mounting the hanger bars of the stationary knife in this manner, the latter may be raised or lowered at the same time the shaft of the rotary cutter is adjusted. The knife 13 is loosely pivoted by rivets or the like 13$^a$ to the bent ends of the hangers or brackets 26 and it may be adjusted angularly by means of set screws 13$^b$ arranged in said ends of the hangers or brackets, as shown more clearly in Fig. 7.

My invention also comprises two deflecting or guiding members 31 which are arranged in a plane slightly below the cutting mechanism and which serve to direct the branches of the cotton plants to the center of the machine and into the path of said cutting mechanism. These deflectors 31 are preferably in the form of rods bent upon themselves as shown at 32 to provide long curved deflecting arms 33 and short attaching arms 34. The arms 34 have flat end portions apertured to receive the U-shaped bolts or clips 35 which surround the upright portions of the front hanger or member 2 and serve to rigidly secure the deflectors in horizontal positions. By sliding the clamps 35 up and down upon the vertical portions of the member 2 they may be adjusted at any desired height to correspond with the adjustment of the cutting mechanism.

The transverse cutter shaft 16 is driven from one of the supporting wheels 8, preferably, by providing a sprocket chain 36 between a sprocket pinion 37 fixed on one end of said shaft and a sprocket wheel or gear 38 suitably clamped or otherwise fixed to the hub or the spokes of said wheel. The end of the shaft containing the sprocket pinion 37 is preferably supported by a bearing bracket 39 which is pivoted at 39$^a$ to the adjacent spindle bracket 6 as shown.

In operation, when the cultivator is drawn forwardly the motion of the wheel 8 will be imparted by the sprocket chain gearing to the cutter shaft 16, the rotation of which latter will cause the rotary cutter 12 to sever the tops of the cotton plants that are deflected into its path and against the stationary knife or cutter 13, it being understood that the machine straddles a row of cotton plants as it is drawn through the field.

By mounting the cutting mechanism and the deflectors or guides so that they may be adjusted vertically it will be seen that the cotton may be topped to a greater or less extent as desired and that the parts may be adjusted for operating upon cotton plants of any height.

It will be noted that the invention is comparatively simple and inexpensive in construction and at the same time strong and durable and that it will be very effective in accomplishing its intended purpose.

While I have shown and described in detail the preferred embodiment of my invention it will be understood that I do not limit myself to the precise showing set forth since various changes in the form, proportion and minor details may be resorted to without departing from the spirit or sacrificing any of the advantages of the invention.

Having thus described my invention what I claim is:

1. The combination of a frame having an arched portion, supporting wheels therefor, clamps upon said frame, vertically disposed hanger bars slidably arranged in said clamps, a shaft journaled in said hanger bars, a rotary cutter upon said shaft, means for operating said shaft from one of said supporting wheels, a relatively stationary knife and means for adjusting said stationary knife to cause it to co-act with the rotary cutter.

2. The combination of a frame having an arched portion, supporting wheels for the frame, vertically adjustable bearings, a transverse shaft in said bearings, means for driving said shaft from one of said wheels, a rotary cutter upon said shaft and arranged in the arched portion of the frame, a stationary knife to co-act with said cutter, hanger bars loosely mounted on the shaft and connected to the ends of said knife and adjustable connections between said hanger bars and the frame.

3. The combination of a frame having an arched portion, supporting wheels for the frame, vertically adjustable bearings upon the frame, a transverse shaft in said bearings, gearing between said shaft and one of the supporting wheels, a rotary cutter upon said shaft in the arched portion of the frame, a stationary knife to co-act with the cutter, hanger bars loosely mounted on the shaft and connected to the ends of said knife, adjustable connections between said hanger bars and the frame and deflectors adjustably connected to the frame and adapted to guide the plants into the path of the rotary cutter and its co-acting knife.

4. The combination of a frame having an arched portion, supporting wheels for the frame, vertically adjustable bearings, a transverse shaft in said bearings, means for driving said shaft from one of said wheels, a rotary cutter upon said shaft and arranged in the arched portion of the frame, a stationary knife to co-act with said cutter, hanger bars for the knife each having curved portions pivoted to the shaft and connected to the knife and upright slotted portions, and clips engaged with the frame and arranged in the slotted portions of said hanger bars.

5. The combination of a frame having an arched portion, supporting wheels for the frame, vertically adjustable bearings, a transverse shaft in said bearings, means for driving said shaft from one of said wheels, a rotary cutter upon said shaft and arranged in the arched portion of the frame, a stationary knife to co-act with said cutter, and a supporting means for the knife pivoted to swing from the shaft and adjustably connected to the frame.

6. The combination of a wheeled frame having an arch, a cutting mechanism arranged in said arch and a deflector having an attaching arm vertically adjustable upon one side of the arch and a curved or inclined deflecting arm disposed in a horizontal plane and adapted to direct plants into the path of the cutting mechanism.

7. The combination of a wheeled frame having an arch, a cutting mechanism arranged in said arch, and a vertically adjustable deflector mounted upon one of the upright side portions of the arch and adapted to direct plants into the path of the cutting mechanism.

8. The combination of a wheeled frame having an arch, a cutting mechanism arranged in said arch, a deflector having the curved deflecting arm 33 and the short attaching arm 34 and a clip securing said attaching arm 34 to one of the upright side portions of the arch.

In testimony whereof I hereunto affix my signature in the presence of two witnesses.

OSCAR SCHWARZ.

Witnesses:
ALF. DIECKMANN,
J. H. HUSER.